United States Patent
Ahne et al.

(10) Patent No.: US 10,317,999 B2
(45) Date of Patent: Jun. 11, 2019

(54) VIBROTACTILE DRIVER CIRCUIT FOR HAPTIC DEVICES

(71) Applicant: Facebook Technologies, LLC, Menlo Park, CA (US)

(72) Inventors: Adam Ahne, Seattle, WA (US); David R. Perek, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 76 days.

(21) Appl. No.: 15/783,804

(22) Filed: Oct. 13, 2017

(65) Prior Publication Data
US 2019/0113971 A1    Apr. 18, 2019

(51) Int. Cl.
| H01L 41/04 | (2006.01) |
| G06F 3/01 | (2006.01) |
| G06F 3/041 | (2006.01) |

(52) U.S. Cl.
CPC .............. G06F 3/014 (2013.01); G06F 3/016 (2013.01); G06F 3/0414 (2013.01)

(58) Field of Classification Search
CPC ................. H02N 2/14; H02N 2/025
USPC ........................................... 340/407.1, 407.2
See application file for complete search history.

(56) References Cited

U.S. PATENT DOCUMENTS

| 9,197,142 B2 * | 11/2015 | Adachi | ................. | H02N 2/004 |
| 2007/0228875 A1 * | 10/2007 | Miyazawa | ............. | H02N 2/004 |
| | | | | 310/317 |

* cited by examiner

*Primary Examiner* — Brent Swarthout
(74) *Attorney, Agent, or Firm* — Fenwick & West LLP (57) ABSTRACT

A haptic device comprises a wearable material configured to a portion of a user. A vibrotactile actuator is coupled to the wearable material and provides haptic feedback in accordance with a drive signal. A driver circuit is electrically coupled to the vibrotactile actuator and provides the drive signal to the vibrotactile actuator. The driver circuit includes an alternating current (AC) voltage source assembly that has a first AC voltage source and a second AC voltage source, each having a terminal. The terminal of the first AC voltage source is electrically coupled to the vibrotactile actuator. A capacitive element electrically is coupled to the terminal of the negative AC voltage source and a regulating element. The regulating element includes a first coupling point and a second coupling point. The first coupling point is electrically coupled to the capacitive element and the vibrotactile actuator, and the second coupling point is grounded.

20 Claims, 4 Drawing Sheets

VIBROTACTILE DRIVER CIRCUIT FOR HAPTIC DEVICES

BACKGROUND

The present disclosure generally relates to a system for haptic feedback to a user, and specifically to a vibrotactile driver circuit for haptic devices. Virtual reality (VR) is a simulated environment created by computer technology and presented to a user, such as through a system. Some systems include haptic devices that use vibrotactile actuators to provide haptic feedback. Haptic feedback is, in essence, feeling sounds, whether it is the buzz of a cellphone or the rumble of a game controller. Haptic feedback is commonly implemented in VR systems, adding the sense of touch to previously visual-only interfaces. However, conventional driver circuits for vibrotactile actuators are unipolar and typically generate a 200V peak-to-peak voltage from a single voltage source, which can be potentially dangerous to users. It is desirable to use an integrated circuit to reduce size and cost, but it is also substantially more difficult to build an integrated circuit that can drive to 200V.

SUMMARY

To provide a more immersive experience in an artificial reality system, a haptic glove (or some other wearable haptic device) may apply a force to a user's hand to simulate a user's interaction with a virtual object. For example, the system may detect that a user is touching a virtual object, and generate haptic feedback associated with the interaction with the virtual object. The haptic feedback may be generated using one or more vibrotactile actuators.

Embodiments relate to a driver circuit for a vibrotactile actuator. A vibrotactile actuator is coupled to a wearable material and provides haptic feedback in accordance with a drive signal. The driver circuit is electrically coupled to the vibrotactile actuator and provides the drive signal to the vibrotactile actuator. The driver circuit includes an alternating current (AC) voltage assembly that includes a first AC voltage source and a second AC voltage source, each having a terminal. The terminal of the first AC voltage source is electrically coupled to a vibrotactile actuator, a capacitive element electrically coupled to the terminal of the second AC voltage source, and a regulating element that includes a first coupling point and a second coupling point, the first coupling point is electrically coupled to the capacitive element and the vibrotactile actuator, and the second coupling point is grounded, wherein the driver circuit is configured to provide a drive signal to the vibrotactile actuator. The first AC voltage source is a positive voltage source and the second AC voltage source is a negative voltage source. The first AC voltage source is 180 degrees out of phase with the second AC voltage source. In embodiments where the first AC voltage source and the second AC voltage source have a same peak-to-peak voltage of ($|V_{max}|$), the configuration of the driver circuit is such that the peak-to-peak voltage as seen by the vibrotactile actuator is greater than $|V_{max}|$.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewer.

Figure 1:
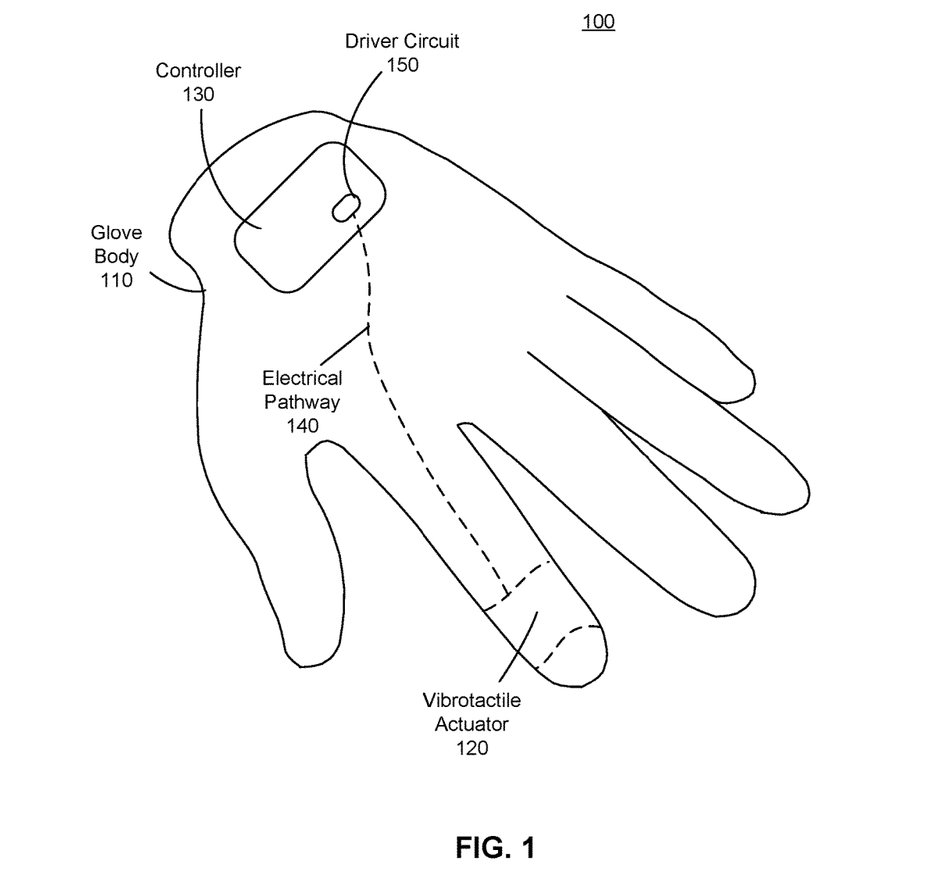
FIG. 1 is a perspective view of a wearable haptic device, in accordance with an embodiment.

FIG. 1 is a perspective view of a haptic device 100, in accordance with an embodiment. In one embodiment, the haptic device comprises a glove body 110, a vibrotactile actuator 120, a controller 130, and an electrical pathway 140. The glove body 110 illustrated in FIG. 1 is merely an example, and in different embodiments, the glove body 110 includes fewer, more or different components than shown in FIG. 1. Additionally, in alternate embodiments, the haptic device 100 may be some other wearable haptic device.

A glove body 110 is flexible and moves with articulation of a user's hand and/or fingers. In various embodiments, the glove body 110 comprises an elastomer substrate (e.g., a flexible fiber or other flexible material such as rubber or skin) configured to bend and/or flex with the user as the user interacts with a virtual object. For example, if the user grabs a virtual apple in a VR environment, the glove body 110 is configured to deform in conjunction to the user's hand in order to mimic a "grabbing" action. While FIG. 1 illustrates a single vibrotactile actuator 120 on a single glove digit, in other embodiments, there can be multiple vibrotactile actuators (e.g., one or more on each glove digit) and multiple electrical pathways. Also, in one or more embodiments, one or more vibrotactile actuators and corresponding driver circuits can be positioned in places on the glove body 110 in addition to and/or other than the position shown in FIG. 1. In some embodiments, the vibrotactile actuators 120 may wrap an entire glove digit of the glove body 110. Likewise, the controller 130 may be coupled to a different portion (e.g., to a wrist, palm, etc.) of the glove body 110 that the position shown in FIG. 1.

The vibrotactile actuator 120 provides haptic feedback to a user of the haptic device 110. The vibrotactile actuator 120 is a device that vibrates in accordance with a drive signal provided by the controller 130, and specifically by a corresponding driver circuit of the controller 130. The drive signal controls frequency of vibration, amplitude of vibration, some other parameter of haptic feedback, or some combination thereof. The vibrotactile actuator 120 is coupled to the wearable material 110.

The controller 130 controls one or more vibrotactile actuators on the haptic device 100. The controller 130 includes one or more driver circuits that each drive at least one vibrotactile actuator. In some embodiments, the controller 130 receives a haptic feedback signal from a console, HMD, or some other device. The controller 130 selects a driver circuit of the one or more driver circuits using the haptic feedback signal, and instructs the selected driver circuit to generate a drive signal. The selected driver circuit generates a drive signal which is then provided to one or more of its corresponding vibrotactile actuators coupled to the selected driver circuit. For example, the controller 130 may select a driver circuit 150, which generates a drive signal that is provided to the vibrotactile actuator 120 via the electrical pathway 140. Additional detail regarding driver circuits is discussed in detail below with regard to FIGS. 2-4. Note that while FIG. 1 illustrates the driver circuit 150 to be within the controller 130, in other embodiments, some or all of the driver circuits may be external to the controller 130. For example, a driver circuit may be co-located or otherwise in close proximity to one or more of its corresponding vibrotactile actuators.

The electrical pathway 140 is a flexible conductive material that electrically couples electrically couples the vibrotactile actuator 120 to the controller 130. The electrical pathways 140 may be a single conductive pathway or multiple conductive pathways that are electrically coupled together. In some embodiments, the electrical pathway 140 may electrically couple a plurality of vibrotactile actuators to the controller 130 (and specifically to their respective driver circuits). The electrical pathway 140 passes a drive signal from the controller 130 to the vibrotactile actuator 120. The electrical pathway 140 may be composed of, e.g., conductive metals, conductive plastic polymers with metal ions, a conductor within an elastomeric shell, some other flexible conductive material, or some combination thereof.

Figure 2:
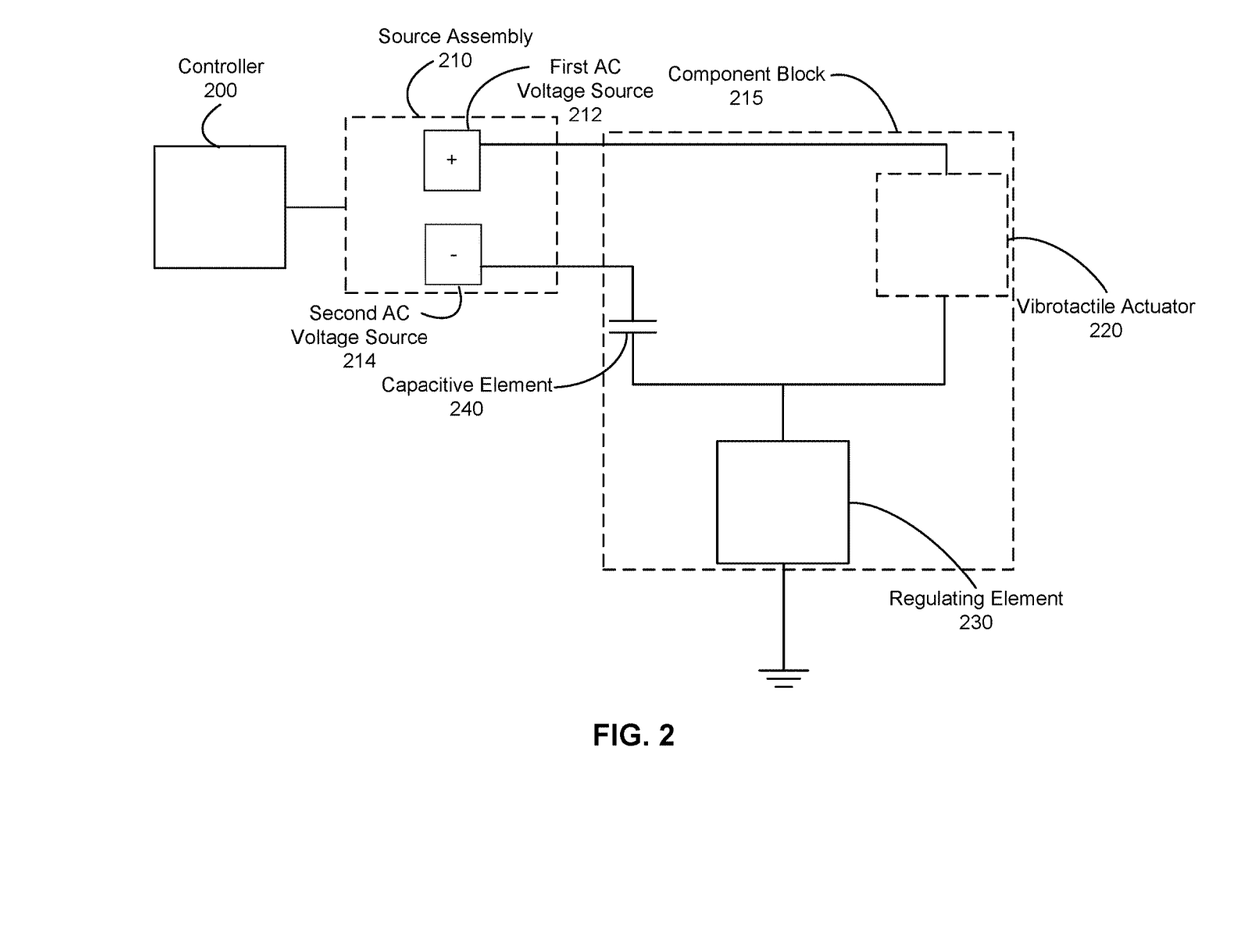
FIG. 2 is a schematic illustrating the driver circuit, in accordance with an embodiment.

FIG. 2 is a schematic illustrating a driver circuit, in accordance with an embodiment. In one embodiment, the driver circuit includes an alternating current (AC) commutatively coupled to a controller 200, a voltage source 210, and a component block 215.

The AC voltage source assembly 210 powers the driver circuit. The AC voltage source assembly 210 includes a first AC voltage source 212 and a second AC voltage source 214. The second AC voltage source 214 is the inverse of the first AC voltage source 212. The first AC voltage source is 180 degrees out of phase with the second AC voltage source. In embodiments where the first AC voltage source and the second AC voltage source have a same peak-to-peak voltage of ($|V_{max}|$), the configuration of the driver circuit is such that the peak-to-peak voltage as seen by the vibrotactile actuator is greater than $|V_{max}|$, and preferably greater than $1.5*|V_{max}|$ for improved efficiency. The first AC voltage source 212 and the second AC voltage source 214 each have a terminal. The terminal of the first AC voltage source 212 is electrically coupled to the vibrotactile actuator 220, and the terminal of the second AC voltage source 214 is electrically coupled to the capacitive element 240. The AC voltage source assembly 210 generates AC voltage that is sufficient to power the vibrotactile actuator 220. In some embodiments, the peak-to-peak voltage of the first AC voltage source 212 and the second AC voltage source 214 may have a range of 0 to 110 volts. The positive AC voltage source 212 and the second AC voltage source 214 may operate at a frequency of 1 to 100 Hz. The first AC voltage source 212 and the second AC voltage source 214 may generate arbitrary waveforms that are, for example, sinusoidal, square, triangle, etc. Note, while in FIG. 2, the AC source assembly 210 is coupled to a single component block 215, in alternate embodiments the AC source assembly 210 may be coupled to multiple component blocks 315.

In one embodiment, the component block 215 includes the vibrotactile actuator 220, the regulating element 230, and the capacitive element 240. The component block 215 is configured to lower the maximum voltage of the first AC voltage source 212 and the second AC voltage source 214. Because some vibrotactile actuators cannot tolerate being driven in a bi-polar configuration, in some embodiments the driver circuit generates a 0 to 180V peak-to-peak unipolar drive using two 0 to 100V peak-to-peak AC voltage sources. It is substantially more difficult to build an integrated circuit (IC) to drive to 180V than it is to drive to 100V. Also, a driver circuit that can drive to 180V typically has a 180V direct current (DC) power supply instead of a 100V power supply, which is dangerous if exposed to a user.

The configuration and operation of the vibrotactile actuator 220 are similar to the vibrotactile actuator 120 of FIG. 1. Therefore, the detailed description thereof is omitted herein for the sake of brevity.

The regulating element 230 includes a first coupling point and a second coupling point. The first coupling point is electrically coupled to the capacitive element 240 and the vibrotactile actuator 220, and the second coupling point is grounded. In one embodiment, the regulating element 230 is a diode. The diode is configured to allow an electric current to pass in one direction while blocking current in the opposite direction. The diode anode is electrically coupled to the capacitive element 240. The diode cathode is grounded. In another embodiment, the regulating element 230 is a negative DC source electrically coupled to a diode to provide a DC bias to the vibrotactile actuator 220. The negative DC source may have a value of at least −48 volts. In one embodiment, the voltage between a vibrotactile actuator terminal and ground is greater than the voltage between either AC voltage terminal and ground.

The capacitive element 240 stores an electrical charge and includes a first coupling point and a second coupling point. The first coupling point is electrically coupled to the regulating element 230 and the second coupling point is electrically coupled to the terminal of the negative AC voltage source 214. In one embodiment, the capacitive element is a capacitor. The capacitor may have a capacitance that is at least ten times greater than the vibrotactile actuator capacitance to maximize the peak-to-peak voltage across the vibrotactile actuator. If the ratio between the capacitor and the vibrotactile actuator capacitance is 10 to 1, there can be approximately 10 percent voltage lost across the capacitor. In some embodiments, the vibrotactile actuator 220 is primarily capacitive for frequencies between 10 Hz and 100 Hz. This improves the efficiency of the drive circuit. An example vibrotactile actuator that is primarily capacitive at these frequencies has an effective capacitance of 200 nF and leakage resistance of greater than one megohm.

Figure 3:
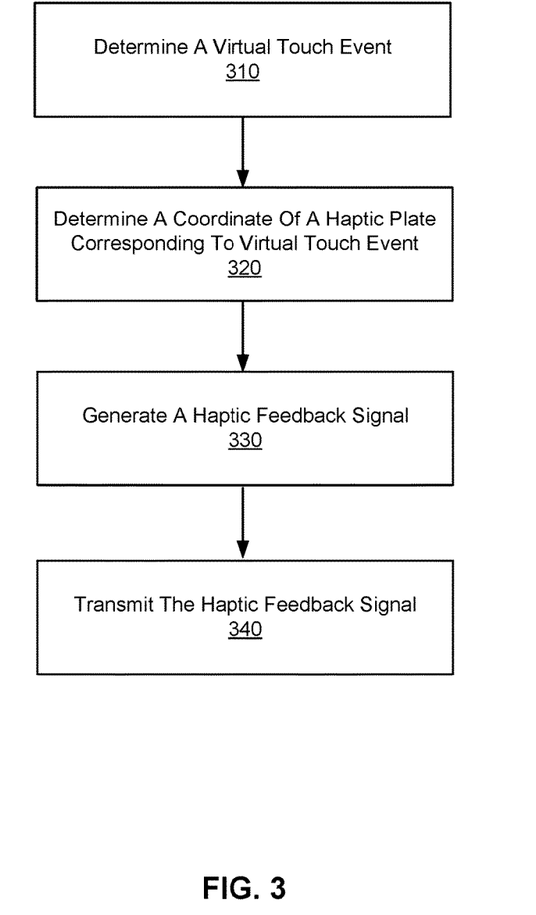
FIG. 3 is a flow chart illustrating a process of providing haptic feedback responsive to a virtual touch event in a virtual space, in accordance with an embodiment.

FIG. 3 is a flow chart illustrating a process of providing haptic feedback responsive to a virtual touch event in a virtual space, in accordance with an embodiment. In one embodiment, the process of FIG. 3 is performed by a console. Other entities may perform some or all of the steps of the process in other embodiments. Likewise, embodiments may include different and/or additional steps, or perform the steps in different orders.

The console determines 310 a virtual touch event. In one embodiment, the console receives IMU data from the haptic device and/or imaging data from the imaging device, and then determines a hand movement. In one approach, the console obtains a three dimensional (3-D) map of the user hand describing coordinates of various parts of the haptic device in a virtual space corresponding to physical positions of the parts of the haptic device in reality based on the inertial measurement unit (IMU) data and/or the imaging data. The console compares the coordinate of the virtual object in the virtual space and the coordinate of the haptic device in the virtual space to determine whether a virtual touch event occurred. Responsive to determining the virtual touch event occurred, the console determines 320 a coordinate of a haptic apparatus corresponding to the virtual touch event. For example, responsive to the user pressing a plush ball in a virtual space with an index finger, the console determines such virtual touch event occurred, and identifies the haptic apparatus corresponding to the index finger.

The console generates 330 a haptic feedback signal describing details of the haptic feedback to be provided, according to the coordinate. In one embodiment, the haptic feedback signal indicates which vibrotactile actuator should be actuated. In alternate embodiments, the haptic feedback signal indicates which driver circuit should be selected to generate a drive signal. Moreover, the console transmits the haptic feedback signal 340 to the controller. In one embodiment, the controller selects a driver circuit of the one or more driver circuits using the haptic feedback signal and instructs the selected driver circuit to generate a drive signal. The selected driver circuit generates a drive signal which is then provided to one or more of its corresponding vibrotactile actuators coupled to the selected driver circuit.

The vibrotactile actuator receives the drive signal, and then provides haptic feedback to the user according to the drive signal. In the embodiment in which the haptic feedback signal identifies a vibrotactile actuator and an amount of actuation, the controller actuates the vibrotactile actuator as identified by the haptic feedback signal, as described in detail with respect to FIGS. 1 through 2. In the embodiment in which the haptic feedback signal identifies a driver circuit, the controller 130 instructs the identified driver circuit to generate a drive signal which is then provided to its corresponding vibrotactile actuator, as described in detail with respect to FIGS. 1 through 2.

Figure 4:
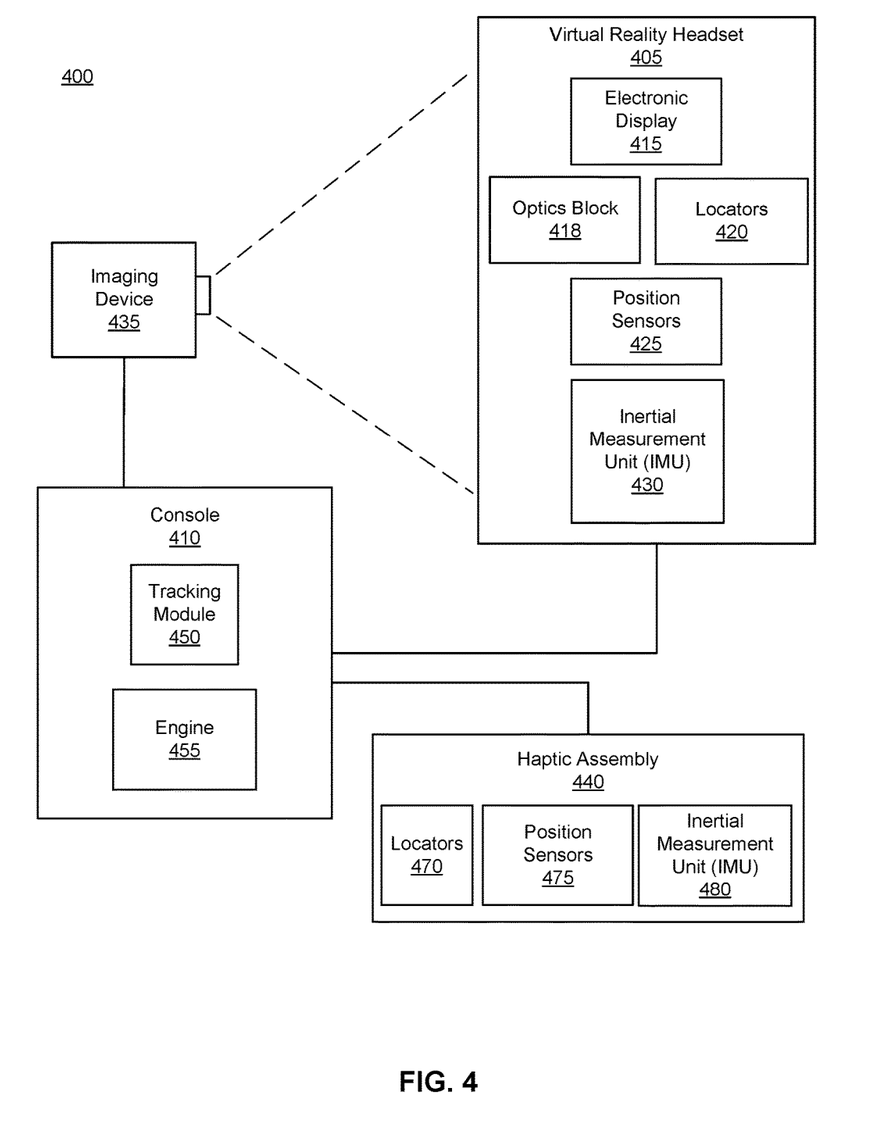
FIG. 4 is a block diagram of a system environment including a system, in accordance with an embodiment.

FIG. 4 is a block diagram of an artificial reality system 400 in accordance with an embodiment. The system 400 shown by FIG. 4 comprises a headset 405, a console 410, an imaging device 435, and a haptic assembly 440. While FIG. 4 shows an example system 400 including one headset 405, one imaging device 435, and one haptic assembly 440 (e.g., a haptic glove), in other embodiments any number of these components may be included in the system 400. For example, there may be multiple headsets 405 each having an associated haptic assembly 440 and being monitored by one or more imaging devices 435, with each headset 405, haptic assembly 440, and imaging devices 435 communicating with the console 410. In alternative configurations, different and/or additional components may be included in the system environment 400. Similarly, the functions can be distributed among the components in a different manner than is described here. For example, some or all of the functionality of the console 410 may be contained within the headset 405.

The headset 405 is a head-mounted display that presents media to a user. Examples of media presented by the headset include one or more images, video, audio, or any combination thereof. In some embodiments, audio is presented via an external device (e.g., speakers and/or headphones) that receives audio information from the headset 405, the console 410, or both, and presents audio data based on the audio information. In some embodiments, the headset 405 may also act as an augmented reality (AR) headset. In these embodiments, the headset 405 augments views of a physical, real-world environment with computer-generated elements (e.g., images, video, sound, etc.).

The headset 405 includes an electronic display 415, an optics block 418, one or more locators 420, one or more position sensors 425, and an inertial measurement unit (IMU) 430.

The electronic display 415 displays images to the user in accordance with data received from the console 410. In one embodiment, the electronic display 415 displays images by emitting light. In another embodiment, the electronic display 415 displays images by modulating available light during a process of reflection or transmission. The electronic display may be a liquid crystal display (LCD), for example.

The optics block 418 magnifies received light from the electronic display 415, corrects optical errors associated with the image light, and the corrected image light is presented to a user of the headset 405. An optical element may be an aperture, a Fresnel lens, a convex lens, a concave lens, a filter, or any other suitable optical element that affects the image light emitted from the electronic display 415. Moreover, the optics block 418 may include combinations of different optical elements. In some embodiments, one or more of the optical elements in the optics block 418 may have one or more coatings, such as anti-reflective coatings.

The locators 420 are objects located in specific positions on the headset 405 relative to one another and relative to a specific reference point of the headset 405 on the headset 405. A locator 420 may be a light emitting diode (LED), a corner cube reflector, a reflective marker, a type of light source that contrasts with an environment in which the headset 405 operates, or some combination thereof. In embodiments where the locators 420 are active (i.e., an LED or other type of light emitting device), the locators 420 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 420 are located beneath an outer surface of the headset 405, which is transparent to the wavelengths of light emitted or reflected by the locators 420 or is thin enough not to substantially attenuate the wavelengths of light emitted or reflected by the locators 420. Additionally, in some embodiments, the outer surface or other portions of the headset 405 are opaque in the visible band of wavelengths of light. Thus, the locators 420 may emit light in the IR band under an outer surface that is transparent in the IR band but opaque in the visible band.

The IMU 430 is an electronic device that generates IMU data of the headset 405 based on measurement signals received from one or more of the position sensors 425. A position sensor 425 generates one or more measurement signals in response to motion of the headset 405. Examples of position sensors 425 include: one or more accelerometers, one or more gyroscopes, one or more magnetometers, another suitable type of sensor that detects motion, a type of sensor used for error correction of the IMU 430, or some combination thereof. The position sensors 425 may be located external to the IMU 430, internal to the IMU 430, or some combination thereof.

Based on the one or more measurement signals from one or more position sensors 425, the IMU 430 generates IMU data of the headset 405 indicating an estimated position of the headset 405 relative to an initial position of the headset 405. For example, the position sensors 425 include multiple accelerometers to measure translational motion (forward/back, up/down, left/right) and multiple gyroscopes to measure rotational motion (e.g., pitch, yaw, roll) of the headset 405. In some embodiments, the IMU 430 rapidly samples the measurement signals and calculates the estimated position of the headset 405 from the sampled data. For example, the IMU 430 integrates the measurement signals received from the accelerometers over time to estimate a velocity vector and integrates the velocity vector over time to determine an estimated position of a reference point of the headset 405 on the headset 405. Alternatively, the IMU 430 provides the sampled measurement signals to the console 410, which determines the IMU data of the headset 405. The reference point of the headset 405 is a point that may be used to describe the position of the headset 405. While the reference point of the headset 405 may generally be defined as a point in space; however, in practice the reference point of the headset 405 is defined as a point within the headset 405 (e.g., a center of the IMU 430).

The IMU 430 receives one or more calibration parameters of the headset 405 from the console 410. As further discussed below, the one or more calibration parameters of the headset 405 are used to maintain tracking of the headset 405. Based on a received calibration parameter of the headset 405, the IMU 430 may adjust one or more IMU parameters (e.g., sample rate). In some embodiments, certain calibration parameters of the headset 405 cause the IMU 430 to update an initial position of the reference point of the headset 405 so it corresponds to a next calibrated position of the reference point of the headset 405. Updating the initial position of the reference point of the headset 405 as the next calibrated position of the reference point of the headset 405 helps reduce accumulated error associated with the determined estimated position. The accumulated error, also referred to as drift error, causes the estimated position of the reference point of the headset 405 to "drift" away from the actual position of the reference point of the headset 405 over time.

The haptic assembly 440 is an apparatus for providing haptic feedback to the user. The haptic assembly 440 includes locators 470, one or more position sensors 475, an inertial measurement unit (IMU) 480. In some embodiments, the locators 470, one or more position sensors 475, an inertial measurement unit (IMU) 480 are employed to determine a position or movement of the haptic assembly 440. The haptic assembly 440 provides haptic feedback to a user in accordance with the haptic feedback signal received from the console 410.

In one embodiment, the haptic feedback signal indicates a position or a portion of the haptic assembly 440 to be actuated for providing haptic feedback.

In another embodiment, the haptic feedback signal indicates a driver circuit for providing a drive signal. In this embodiment, the drive signal is provided to a corresponding vibrotactile actuator that is to be actuated. The haptic assembly 440 provides haptic feedback to a user at the position or portion of the haptic assembly 440 (i.e. the vibrotactile actuator) according to the haptic feedback signal.

The locators 470 are objects located in specific positions on the haptic assembly 440 relative to one another and relative to a specific reference point of the haptic assembly 440 on the haptic assembly 440. A locator 470 is substantially similar to a locator 420 except that a locator 470 is part of the haptic assembly 440. Additionally, in some embodiments, the outer surface or other portions of the haptic assembly 440 are opaque in the visible band of wavelengths of light. Thus, the locators 470 may emit light in the IR band under an outer surface that is transparent in the IR band but opaque in the visible band.

A position sensor 475 generates one or more measurement signals in response to motion of the haptic assembly 440. The position sensors 475 are substantially similar to the positions sensors 425, except that the position sensors 475 are part of the haptic assembly 440. The position sensors 475 may be located external to the IMU 480, internal to the IMU 480, or some combination thereof.

Based on the one or more measurement signals from one or more position sensors 475, the IMU 480 generates IMU data of the haptic assembly 440 indicating an estimated position of the haptic assembly 440 relative to an initial position of the haptic assembly 440. For example, the position sensors 475 include multiple accelerometers to measure translational motion (forward/back, up/down, left/right) and multiple gyroscopes to measure rotational motion (e.g., pitch, yaw, roll) of the haptic assembly 440. In some embodiments, the IMU 480 rapidly samples the measurement signals and calculates the estimated position of the haptic assembly 440 from the sampled data. For example, the IMU 480 integrates the measurement signals received from the accelerometers over time to estimate a velocity vector and integrates the velocity vector over time to determine an estimated position of a reference point of the haptic assembly 440. Alternatively, the IMU 480 provides the sampled measurement signals to the console 410, which determines the IMU data of the haptic assembly 440. The reference point of the haptic assembly 440 is a point that may be used to describe the position of the haptic assembly 440. While the reference point of the haptic assembly 440 may generally be defined as a point in space; however, in practice the reference point of the haptic assembly 440 is defined as a point within the haptic assembly 440 (e.g., a center of the IMU 480).

The IMU 480 receives one or more calibration parameters of the haptic assembly 440 from the console 410. As further discussed below, the one or more calibration parameters of the haptic assembly 440 are used to maintain tracking of the haptic assembly 440. Based on a received calibration parameter of the haptic assembly 440, the IMU 480 may adjust one or more IMU parameters (e.g., sample rate). In some embodiments, certain calibration parameters of the haptic assembly 440 cause the IMU 480 to update an initial position of the reference point of the haptic assembly 440 so it corresponds to a next calibrated position of the reference point of the haptic assembly 440. Updating the initial position of the reference point of the haptic assembly 440 as the next calibrated position of the reference point of the haptic assembly 440 helps reduce accumulated error associated with the determined estimated position.

The haptic assembly 440 includes a haptic device through which the console 410 can detect a user hand movement and provide tactile perception to the user hand. The haptic device includes one or more driver circuits that are coupled to one or more vibrotactile actuators. In some embodiments, the haptic device is the haptic device 100. The haptic device receives a haptic feedback signal indicating a driver circuit and its corresponding vibrotactile actuator from the console 410, and then provides haptic feedback to the user accordingly, as described in detail with respect to FIGS. 2 through 4.

The imaging device 435 generates imaging data in accordance with calibration parameters received from the console 410. Imaging data (herein also referred to as "imaging information") of the headset includes one or more images showing observed positions of the locators 420 associated with the headset 405 that are detectable by the imaging device 435. Similarly, imaging data of the haptic assembly 440 includes one or more images showing observed positions of the locators 470 associated with the haptic assembly 440 that are detectable by the imaging device 435. In one aspect, the imaging data includes one or more images of both the headset 405 and haptic assembly 440. The imaging device 435 may include one or more cameras, one or more video cameras, any other device capable of capturing images including one or more of the locators 420 and 470, or any combination thereof. Additionally, the imaging device 435 may include one or more filters (e.g., used to increase signal to noise ratio). The imaging device 435 is configured to detect light emitted or reflected from locators 420 and 470 in a field of view of the imaging device 435. In embodiments where the locators 420 and 470 include passive elements (e.g., a retroreflector), the imaging device 435 may include a light source that illuminates some or all of the locators 420 and 470, which retro-reflect the light towards the light source in the imaging device 435. Imaging data is communicated from the imaging device 435 to the console 410, and the imaging device 435 receives one or more calibration parameters from the console 410 to adjust one or more imaging parameters (e.g., focal length, focus, frame rate, ISO, sensor temperature, shutter speed, aperture, etc.).

The console 410 provides media to the headset 405 for presentation to the user in accordance with information received from one or more of: the imaging device 435, the headset 405, and the haptic assembly 440. In the example shown in FIG. 4, the console 410 includes a tracking module 450 and an engine 455. Some embodiments of the console 410 have different modules than those described in conjunction with FIG. 4. Similarly, the functions further described below may be distributed among components of the console 410 in a different manner than is described here.

The tracking module 450 calibrates the system 400 using one or more calibration parameters and may adjust one or more calibration parameters to reduce error in determination of the position of the headset 405 and/or the haptic assembly 440.

The tracking module 450 tracks movements of the headset 405 using imaging information of the headset 405 from the imaging device 435. The tracking module 450 determines positions of a reference point of the headset 405 using observed locators from the imaging information and a model of the headset 405. The tracking module 450 also determines positions of a reference point of the headset 405 using position information from the IMU information of the headset 405. Additionally, in some embodiments, the tracking module 450 may use portions of the IMU information, the imaging information, or some combination thereof of the headset 405, to predict a future location of the headset 405. The tracking module 450 provides the estimated or predicted future position of the headset 405 to the engine 455.

In addition, the tracking module 450 tracks movements of the haptic assembly 440 using imaging information of the haptic assembly 440 from the imaging device 435. The tracking module 450 determines positions of a reference point of the haptic assembly 440 using observed locators from the imaging information and a model of the haptic assembly 440. The tracking module 450 also determines positions of a reference point of the haptic assembly 440 using position information from the IMU information of the haptic assembly 440. Additionally, in some embodiments, the tracking module 450 may use portions of the IMU information, the imaging information, or some combination thereof of the haptic assembly 440, to predict a future location of the haptic assembly 440. The tracking module 450 provides the estimated or predicted future position of the haptic assembly 440 to the engine 455.

The engine 455 executes applications within the system environment 400 and receives position information, acceleration information, velocity information, predicted future positions, or some combination thereof of the headset 405 from the tracking module 450. Based on the received information, the engine 455 determines content to provide to the headset 405 for presentation to the user. For example, if the received information indicates that the user has looked to the left, the engine 455 generates content for the headset 405 that mirrors the user's movement in a virtual environment. Additionally, the engine 455 performs an action within an application executing on the console 410 in response to detecting a motion of the haptic assembly 440 and provides feedback to the user that the action was performed. In one example, the engine 455 instructs the headset 405 to provide visual or audible feedback to the user. In another example, the engine 455 instructs the haptic assembly 440 to provide haptic feedback to the user.

In addition, the engine 455 receives position information, acceleration information, velocity information, predicted future positions, or some combination thereof of the haptic assembly 440 from the tracking module 450 and determines whether a virtual touch event occurred. A virtual touch even herein refers to an event of a user contacting a virtual object in a virtual space. For example, an image of a virtual object is presented to the user on the headset 405. Meanwhile, the engine 455 collectively analyzes positions of multiple sensors of the haptic assembly 440 through the tracking module 450, and generates a three dimensional mapping of the haptic assembly 440 describing the position and the shape of the haptic assembly 440. The three dimensional mapping of the haptic assembly 440 describes coordinates of various parts of the haptic assembly 440 in a virtual space corresponding to physical positions of the parts of the haptic assembly 440 in reality. Responsive to the user performing an action to grab the virtual object or the user being contacted by the virtual object, the engine 455 determines that the virtual touch event occurred.

In one embodiment, the engine 455 compares coordinates of a virtual object and a coordinate of the haptic assembly 440 in a virtual space to determine whether a virtual touch event occurred. The engine 455 obtains a coordinate of the virtual object in a virtual space, in accordance with an image presented via the headset 405. Additionally, the engine 455 obtains a coordinate of the haptic assembly 440 (e.g., haptic glove) corresponding to a physical position of the VR haptic assembly 440 from the tracking module 450 or the three dimensional mapping of the haptic assembly 440. Then, the engine 455 compares the coordinate of the virtual object in the virtual space and the coordinate of the haptic assembly 440 in the virtual space. For example, if two coordinates of the virtual object and the haptic assembly 440 overlap or are approximate to each other within a predetermined distance for a predetermined amount of time (e.g., 1 second), the console 410 determines the virtual touch event occurred.

In one embodiment, the engine 455 generates a haptic feedback signal responsive to the virtual touch event detected. In one aspect, the haptic feedback signal indicates which portion (e.g., a coordinate or a position) of the haptic assembly 440 to provide haptic feedback. The engine 455 provides the haptic feedback signal to the haptic assembly 440 for executing the haptic feedback.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A haptic glove comprising:
a glove body configured to cover a hand;
a vibrotactile actuator coupled to the glove body and configured to provide haptic feedback in accordance with a drive signal;
a driver circuit that is electrically coupled to the vibrotactile actuator and is configured to provide the drive signal to the vibrotactile actuator, the driver circuit comprising:
an alternating current (AC) voltage source assembly that includes a first AC voltage source and a second AC voltage source, each having a terminal, wherein the terminal of the first AC voltage source is electrically coupled to the vibrotactile actuator,
a capacitive element electrically coupled to the terminal of the second AC voltage source, and
a regulating element that includes a first coupling point and a second coupling point, the first coupling point is electrically coupled to the capacitive element and the vibrotactile actuator, and the second coupling point is grounded.

2. The haptic glove according to claim 1, wherein the voltage between a vibrotactile actuator terminal and ground is greater than the voltage between either AC voltage terminal and ground.

3. The haptic glove according to claim 1, wherein the regulating element is a diode.

4. The haptic glove according to claim 1, wherein the regulating element is a negative DC source electrically coupled to a diode.

5. The haptic glove according to claim 4, wherein the negative DC source provides a DC bias to the vibrotactile actuator.

6. The haptic glove according to claim 4, wherein the negative DC source has a value of at least −48 volts.

7. The haptic glove according to claim 4, wherein the voltage between a vibrotactile actuator terminal and ground is greater than the voltage between either AC voltage terminal and ground.

8. A wearable haptic device comprising:
a wearable material configured to cover a body part of a user;
a vibrotactile actuator coupled to the wearable material and configured to provide haptic feedback in accordance with a drive signal;
a driver circuit that is electrically coupled to the vibrotactile actuator and is configured to provide the drive signal to the vibrotactile actuator, the driver circuit comprising:
an alternating current (AC) voltage source assembly that includes a first AC voltage source and a second AC voltage source, each having a terminal, wherein the terminal of the first AC voltage source is electrically coupled to the vibrotactile actuator,
a capacitive element electrically coupled to the terminal of the second AC voltage source, and
a regulating element that includes a first coupling point and a second coupling point, the first coupling point is electrically coupled to the capacitive element and the vibrotactile actuator, and the second coupling point is grounded.

9. The wearable haptic device according to claim 8, wherein the voltage between a vibrotactile actuator terminal and ground is greater than the voltage between either AC voltage terminal and ground.

10. The wearable haptic device according to claim 8, wherein the regulating element is a diode.

11. The wearable haptic device according to claim 8, wherein the regulating element is a negative DC source electrically coupled to a diode.

12. The wearable haptic device according to claim 11, wherein the negative DC source provides a DC bias to the vibrotactile actuator.

13. The wearable haptic device according to claim 11, wherein the voltage between a vibrotactile actuator terminal and ground is greater than the voltage between either AC voltage terminal and ground.

14. A driver circuit comprising:
   an alternating current (AC) voltage source assembly that includes a first AC voltage source and a second AC voltage source, each having a terminal, wherein the terminal of the first AC voltage source is electrically coupled to a vibrotactile actuator,
   a capacitive element electrically coupled to the terminal of the second AC voltage source, and
   a regulating element that includes a first coupling point and a second coupling point, the first coupling point is electrically coupled to the capacitive element and the vibrotactile actuator, and the second coupling point is grounded,
   wherein the driver circuit is configured to provide a drive signal to the vibrotactile actuator.

15. The driver circuit according to claim 14, wherein the voltage between a vibrotactile actuator terminal and ground is greater than the voltage between either AC voltage terminal and ground.

16. The driver circuit according to claim 14, wherein the regulating element is a diode.

17. The driver circuit according to claim 14, wherein the regulating element is a negative DC source electrically coupled to a diode.

18. The driver circuit according to claim 17, wherein the negative DC source provides a DC bias to the vibrotactile actuator.

19. The driver circuit according to claim 17, wherein the negative DC source has a value of at least −48 volts.

20. The driver circuit according to claim 17, wherein the voltage between a vibrotactile actuator terminal and ground is greater than the voltage between either AC voltage terminal and ground.

* * * * *